US008265667B2

(12) United States Patent
Lee (10) Patent No.: US 8,265,667 B2
(45) Date of Patent: Sep. 11, 2012

(54) MULTIMEDIA MESSAGING METHOD AND APPARATUS FOR MOBILE TERMINAL

(75) Inventor: Mi Sun Lee, Anyang-si (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 461 days.

(21) Appl. No.: 12/542,770

(22) Filed: Aug. 18, 2009

(65) Prior Publication Data

US 2010/0113075 A1  May 6, 2010

(30) Foreign Application Priority Data

Nov. 4, 2008  (KR) .................. 10-2008-0108985

(51) Int. Cl.
*H04W 4/00* (2009.01)
(52) U.S. Cl. .............. 455/466; 455/412.1; 455/412.2; 455/415; 455/486; 370/428; 375/296; 379/265.09; 709/206; 709/231
(58) Field of Classification Search ............. 455/412.1, 455/412.2, 415, 466; 379/265.09; 375/296; 709/206, 231; 370/428
See application file for complete search history.

(56) References Cited

U.S. PATENT DOCUMENTS

2003/0193967 A1* 10/2003 Fenton et al. .............. 370/490
2006/0078064 A1*  4/2006 Schmidt et al. ............ 375/296

* cited by examiner

*Primary Examiner* — Amancio Gonzalez
(74) *Attorney, Agent, or Firm* — Cha & Reiter, LLC (57) ABSTRACT

A multimedia messaging method and apparatus for a mobile terminal supporting Multimedia Messaging Service (MMS) is provided for the mobile terminal to relay a multimedia message, edit multimedia object attached to the multimedia message, and feed back the multimedia message attaching the edit multimedia object. A multimedia message transmission method of the present invention includes composing a multimedia message in a multimedia message composition mode, inserting sender information and a recipient information into the multimedia message; creating a relay message by defining a type of the multimedia message as the relay message; and sending the relay message with reference to the recipient information.

26 Claims, 8 Drawing Sheets

FIG. 7d

MULTIMEDIA MESSAGING METHOD AND APPARATUS FOR MOBILE TERMINAL

CLAIM OF PRIORITY

This application claims the benefit of the earlier file date, pursuant to 35 USC 119, to that patent application entitled "MULTIMEDIA MESSAGING METHOD AND APPARATUS FOR MOBILE TERMINAL" filed in the Korean Intellectual Property Office on Nov. 4, 2008 and assigned Serial No. 10-2008-0108985, the contents of which are incorporated herein by reference.

BACKGROUND OF THE INVENTION

1. Field of the Invention

The present invention relates to a mobile communication and, in particular, to a multimedia messaging method and apparatus for a mobile terminal supporting Multimedia Messaging Service (MMS)

2. Description of the Related Art

Mobile terminals are used diversely in various fields with their mobility and capability to store and execute useful application programs and data. Recently, most mobile terminals support data communication services as well as voice communication on the move. Messaging service is the most popular mobile data service as it represents an easy and cost-effective communication tool especially when the user is in a situation when voice call is not allowed or the recipient is in the dead zone for cellular service.

Short Message Service (SMS) is the most well-known text messaging service which has been extended to the Multimedia Message Service (MMS) allowing transmission of multimedia contents such as photos and videos.

Typically, the MMS supports the ability to send a message comprising a combination of rich content including text, sounds, still picture, and motion picture. In order to send the contents using the conventional MMS, the contents are attached to the MMS message in the form of separate files. The conventional MMS also supports forwarding of the MMS message to another recipient. However, the conventional MMS is limited in utilization since the MMS message cannot be relayed across multiple recipients and the multimedia content attached to the MMS message cannot be edited by the recipients.

SUMMARY OF THE INVENTION

In order to overcome the problem of the prior art, the present invention provides a multimedia messaging method and apparatus for a mobile terminal that is capable of relaying a multimedia message across multiple recipients and returning the multimedia message back to a sender.

Also, the present invention provides a multimedia messaging method and apparatus that enables a series of recipients to edit the multimedia objects (i.e., files) attached to the multimedia message and relay and/or feedback the multimedia message attaching the edited multimedia objects.

In accordance with an exemplary embodiment of the present invention, a multimedia message transmission method for a mobile terminal supporting a multimedia messaging service includes composing a multimedia message in a multimedia message composition mode; inserting a sender information and a recipient information into the multimedia message; creating a relay message by defining a type of the multimedia message as the relay message; and sending the relay message with reference to the recipient information.

In accordance with another exemplary embodiment of the present invention, a multimedia message reception method for a mobile terminal supporting a multimedia messaging service includes checking a type of the multimedia message, when a multimedia message is received; alerting a receipt of the relay message to a user, when the type of the multimedia message is a relay message; editing the relay message in response to an instruction of the user; resetting recipient information of the relay message when a relay message forward instruction is input; and sending the relay message based on the reset recipient information.

In accordance with another exemplary embodiment of the present invention, a multimedia message communication apparatus of a mobile terminal supporting a multimedia messaging service includes an input unit which receives information of recipients of a relay message; a display unit which displays a relay picture attached to the relay message; and a control unit which generates and sends the relay message with a message type of a multimedia message, the recipient information, and sender information, resets, the recipient information when receiving a relay message and sends the relay message with the reset recipient information.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In an exemplary embodiment of the present invention, a relay message is delivered to the recipient's mobile terminal through a multimedia message service. The relay message may or may not include multimedia object or text object. That is, the relay message can be transmitted to the recipient's mobile terminals and fed back only for the purpose of sharing the message without attached multimedia object. Although the multimedia messaging method is described with the relay message having an attached picture in an exemplary embodiment of the present invention, the present invention is not limited thereto. For example, the relay message may be transmitted with attachment of other types of multimedia objects or without attachment.

In an exemplary embodiment of the present invention, the term "relay message" denotes a multimedia message attaching an object that is transmitted from a sender's mobile terminal to at least one set of recipient's mobile terminal. The attached object may then be edited (e.g., merged with another object or modified) by at least one of the recipient's mobile terminals and returned to the sender's terminal. In order to achieve the relay function, the message is provided with a relay information field. The relay message can be identified with reference to a message type identifier contained in the relay information field of the multimedia message.

In an exemplary embodiment of the present invention, the term "relay picture" denotes a multimedia object attached to a multimedia message sent from a sender's mobile terminal to at least one recipient's mobile terminal in a set of mobile terminal via a multimedia messaging service and edited by at least one recipient. Also, the relay picture can be a multimedia object selected by the at least one recipient. The relay picture does not need to be attached by the sender but can be attached by at least one of recipients. The relay picture can be replaced with a relay text.

In an exemplary embodiment of the present invention, the term "first relay message sender" denotes a sender's mobile terminal that generates a relay message, selects at least one recipient for relaying the relay message, and sends the relay message to the first recipient. The first relay message sender can receive the relay message fed back by the at least one recipient. The first relay message sender can be identified with reference to a first relay message sender identifier included in the relay information field of the header of the relay message.

In an exemplary embodiment of the present invention, the term "relay message recipient" is a recipient's mobile terminal that is selected by the first relay message sender to receive the relay message from the first relay message sender or a previous relay message recipient. The relay message recipient can be identified with reference to a relay picture field included in the header of the relay message. The relay message recipient can edit the multimedia object attached to the relay message by adding another multimedia object or editing the relayed multimedia object.

In an exemplary embodiment of the present invention, the term "relay information field" includes at least one field constituting a header of a multimedia message format specified in the Open Mobile Alliance (OMA) standard. Particularly, the relay information field includes an X-Mms-Applic-ID field for indicating the relay message recipient and an X-Mms-Reply-Applic-ID field for requesting the relay message recipient to send a reply. Here, the X-Mms-Applic-ID field includes recipient identifier, and the X-Mms-Reply-Applic-ID includes a message check identifier. Also, the relay picture field includes a message type identifier and a sender identifier.

The identifiers for use in the relay information field of the message are explained in detail during the description of the structure of relay information field according to an exemplary embodiment of the present invention.

A body field of the multimedia message format can contain video information. The video information can include the information on the original picture object attached by the sender and the additional picture object attached by the at least one relay message recipient.

In an exemplary embodiment of the present invention, the mobile terminal can be any of a mobile phone, a Personal Digital Assistant (PDA), a smart phone, a communication terminal (including a Code Division Multiple Access (CDMA) terminal, a Wideband CDMA (WCDMA) terminal, a Global System for Mobile communications (GSM) terminal, a General Packet Radio Service (GPRS) terminal, and a Universal Mobile Telecommunication System (UMTS) terminal), and their equivalent devices supporting various types of multimedia messaging services.

Figure 1:
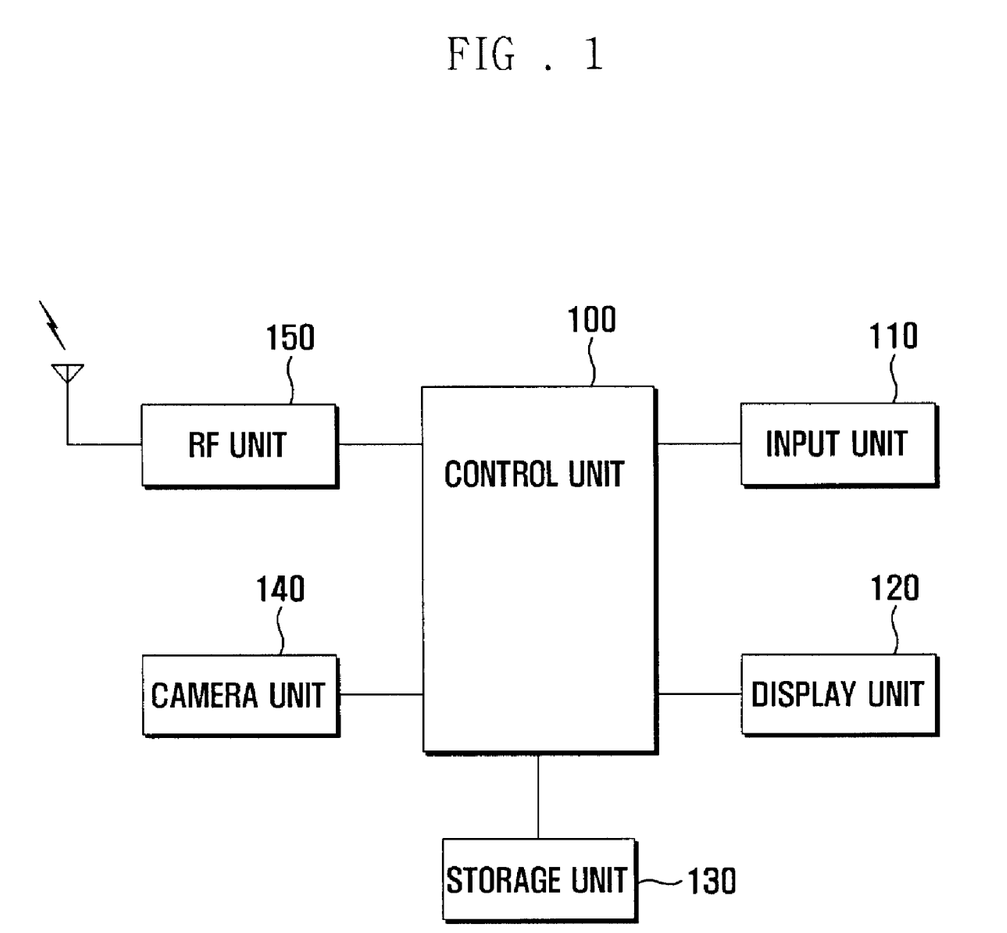
FIG. 1 is a schematic block diagram illustrating a configuration of a mobile terminal according to an exemplary embodiment of the present invention.

FIG. 1 is a schematic block diagram illustrating a configuration of a mobile terminal according to an exemplary embodiment of the present invention.

Referring to FIG. 1, the mobile terminal according to an exemplary embodiment of the present invention includes a control unit 100, an input unit 110, a display unit 120, a storage unit 130, a camera unit 140, and a Radio Frequency (RF) unit 150.

The input unit 110 is provided with a plurality of alphanumeric keys for receiving alphabetic and numeric information and a plurality of function keys for configuring and executing diverse functions of the mobile terminal. The function keys can include navigation keys, volume keys, short keys, and selection keys. The input unit 110 can be implemented with a touchscreen. In this case, the touchscreen can work also as the display unit 120. The input unit 110 transfers the signal corresponding to the key input in association with a user setting and function control of the mobile terminal to the control unit 100. Particularly in an exemplary embodiment of the present invention, the input unit 110 transfers the key signal input associated with editing the relay picture to the control unit 100. The input unit 110 also can transfer the key signal input associated with transmission of the edited relay picture to the control unit 100.

The display unit 120 displays information related to the operations, settings, and function execution results of the mobile terminal. The display unit 120 also displays menus of the mobile terminal, user data input by the user, and activated supplementary functions in the form of a visual picture. The display unit 120 can be implemented with a display panel such as a Liquid Crystal Display (LCD) panel or an Organic Light Emitting Diodes (OLED) panel. The display unit 120 can also support a touchscreen function, if desired. In this case, the display unit 120 can work as a part of the input unit 110. Particularly in an exemplary embodiment of the present invention, the display unit 120 displays the received relay message under the control of the control unit 100. The display unit 120 can also display the relay picture in a picture edit mode or a video list listing the video objects that are stored in the storage unit 130 in response to an input signal.

The storage unit 130 stores application programs associated with the functions related to message processing method according to an exemplary embodiment of the present invention. The storage unit 130 includes a program region and a data region. The program region stores an operating system (OS) for booting up the mobile terminal, and a program for identifying the relay message, a program for editing the data of the video object attached to the relay message, a program for identifying the recipient of the relay picture, and a program for identifying the first relay picture sender. The data region stores the application data generated while the application programs run in the mobile terminal. The application data includes the video data generated in the relay picture edit mode, taken by the camera unit 140 of the mobile terminal, for example, and a relay message received through the multimedia messaging service.

The camera unit 140 takes a picture under the control of the control unit 100 and includes a camera sensor (not shown) for converting an optical signal input through a lens into an electric signal and a signal processor (not shown) for converting the analog video signal output by the camera sensor into digital data. The camera sensor can be implemented with a Charge Coupled Device (CCD) sensor, for example, and the signal processor can be implemented with a Digital Signal Processor (DSP). In an exemplary embodiment of the present invention, the camera unit 140 can take a picture to be added to a video image attached to the relay message under the control of the control unit 100. The camera unit 140 can add a picture in response to a user instruction under the control of the control unit 100 when a new picture add option is selected in the relay picture edit mode.

The RF unit 150 is responsible for establishing a radio communication channel with a base station and processing radio signals exchanged between the mobile terminal and the base station. The RF unit 150 includes an RF transmitter for up-converting and amplifying the frequency of the transmission signal and an RF receiver for low noise amplifying and down-converting the frequency of the received signal. In an exemplary embodiment of the present invention, the RF unit 150 receives the radio signal carrying the relay message and transmits the radio signal carrying the relay message including the edited relay picture via the multimedia messaging service.

The control unit 100 controls general operations of the mobile terminal and signaling among the internal function blocks of the mobile terminal. Particularly in an exemplary embodiment of the present invention, the control unit 100 detects a relay message composition mode execution signal input by the user.

Once the relay message composition mode is executed, the control unit 100 detects a user instruction for selecting at least one of the pictures stored in the storage unit 130. The relay message can be composed without a picture, and the recipient can attach a picture to the received relay message.

The control unit 100 controls the functions in association with composition of a text message. The control unit 100 detects a user input signal for selecting a recipient of the relay message. At this time, the recipient can be selected by name or group registered with a phonebook list.

If a relay message composition complete signal is input, the control unit 100 sets the relay information field for relaying the message. Here, the relay information field is a filed included in the header of the multimedia message format for requesting the recipient of the relay message to edit the relay message and reply. The relay picture field can be set with identification information elements.

If the mobile terminal receives a multimedia message, the control unit 100 of the mobile terminal determines whether the multimedia is a relay message. The control unit 100 can distinguish the relay message from other multimedia messages with reference to the message type identifier contained in the relay information field of the multimedia message. If the received multimedia message is a relay message, the control unit 100 displays the relay picture attached to the relay message on the display unit 120.

After a picture edit mode execution instruction is input, the control unit 100 activates the picture edit mode. In the picture edit mode, the control unit 100 selects a relay picture processing option in response to a user instruction. The relay picture processing options include a new picture add option and a relay picture edit option. The new picture add option includes a storage source sub-option and a camera source sub-option. When the new picture add option and the camera source sub-option are selected sequentially, the control unit 100 controls the camera unit 140 to take a new picture and adds the picture taken by the camera unit 140 to the relay picture. When the new add option and the storage source option are selected in sequence, the control unit 100 retrieves at least one of the pictures stored in the storage unit 130 and adds the retrieved picture to the relay picture in response to a user instruction. The control unit 100 can also edit the relay picture attached to the relay message in response to a user instruction in the picture edit mode.

After the relay picture is edited, the control unit 100 can check the next recipient of the relay message with reference to the recipient identifier field and the message check identifier field included in the relay information field. After checking the next relay message recipient of the relay message, the control unit 100 forwards the relay message, attaching the edited relay message, to the next relay message recipient. If the next relay message recipient is the last recipient of the relay message, the control unit 100 sets the relay message such that the last recipient sends the relay message to the first relay message sender. The control unit 100 can transmit the relay message with the edited relay picture attached to the previous relay message recipient, the next message recipient, and the first relay message sender simultaneously via the multimedia messaging service. In case that the current recipient of the relay message is the last recipient, the control unit 100 controls the operation such that the mobile terminal sends the relay message with the edited relay picture attached to the previous relay message recipient and the first relay message sender.

When a relay message attaching the finally edited relay picture is fed back to the relay message sender via the multimedia message service, the control unit 100 of the relay message sender can analyze the finally edited relay picture attached to the relay message. At this time, the control unit 100 checks the relay picture information included in the body of the multimedia message format.

Figure 2:
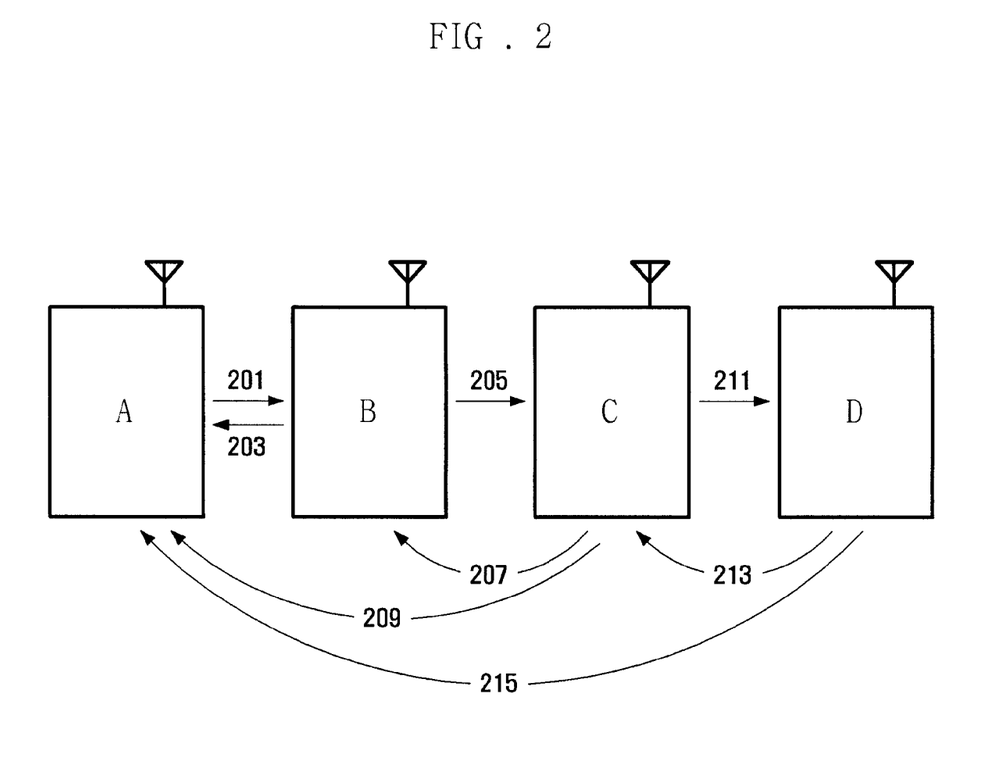
FIG. 2 is a block diagram illustrating how to route a relay message in a MMS system according to an exemplary embodiment of the present invention.

FIG. 2 is a block diagram illustrating how to route a relay message in a MMS system according to an exemplary embodiment of the present invention.

Referring to FIG. 2, a first mobile terminal A sends a relay message to a second mobile terminal B via the multimedia messaging service in response to a user instruction (201). Here, the relay information field of the relay message includes a message type identifier, a sender identifier, a recipient identifier, and a message check identifier.

Upon receipt of the relay message from the first mobile terminal A, the second mobile terminal B analyzes the received relay message. At this time, the second mobile terminal B checks the recipient identifier included in the relay information field and the picture information attached to the relay message. The recipient identifier is set with the information on the recipients selected by the first mobile terminal A. The picture information includes the picture selected by the first mobile terminal A. The second mobile terminal B can edit the picture.

The second mobile terminal B forwards the relay message attaching the modified picture information including the edited picture to the third mobile terminal C as the next relay message recipient (205). At this time, the second mobile terminal B can send the relay message attaching the modified picture information including the edited picture to the first mobile terminal A, i.e. the first sender (203). The second mobile terminal B obtains the next relay message recipient information from the recipient identifier included in the relay information field of the relay message header. The next relay message recipient information lists a series of recipients in sequential order. Before sending the relay message to the next relay message recipient, i.e. the third mobile terminal C, the second mobile terminal B removes its identity information from the recipient identifier included in the relay filed and adds its identity information to the message check identifier. The second mobile terminal B can add another picture to the picture information in addition to the picture attached by the first mobile terminal A or edit the picture that is included in the picture information by the mobile terminal A.

Upon receipt of the relay message from the second mobile terminal B, the third mobile terminal C analyzes the received relay message and checks the recipient identifier included in the relay information field and the picture information attached to the relay message. The recipient identifier includes the information on the recipients selected by the first mobile terminal A except for the information on the second mobile terminal B.

The third mobile terminal C forwards the relay message attaching the modified picture information to the fourth mobile terminal D as the next relay message recipient (211). The mobile terminal C also can send the relay message attaching the modified picture information to the first mobile terminal A as the first relay message sender (209). The third mobile terminal C also can send the relay message attaching the modified picture information to the second mobile terminal B as the previous relay message recipient (207). The third mobile terminal C obtains the information on the next relay message recipient from the recipient identifier included in the relay information field of the relay message header. The next relay message recipient information lists a series of recipients in sequential order. In an exemplary embodiment of the present invention, the third mobile terminal C can send the relay message attaching the modified picture information to the second mobile terminal B as the previous relay message recipient, the fourth mobile terminal D as the next relay message recipient, and the first mobile terminal A as the relay message sender simultaneously. Before sending the relay message, the third mobile terminal C removes its identity information from the recipient identifier included in the relay information field and adds its identity information to the message check identifier. The third mobile terminal C can add another picture to the picture information or further-edit the picture that may have been edited and included in the picture information by the second mobile terminal B.

Upon receipt of the relay message from the third mobile terminal C, the fourth mobile terminal D analyzes the received relay message checks the recipient identifier included in the relay information field and the picture information attached to the relay message. The recipient identifier includes the information on the recipients selected by the first mobile terminal A except for the information on the second and third mobile terminals B and C. The picture information includes the picture attached by the first mobile terminal A together with the pictures edited or added by the second and third mobile terminal B and C.

In FIG. 2, the fourth mobile terminal D is a final recipient of the relay message. The fourth mobile terminal D as the final recipient of the relay message sends the relay message attaching the modified picture information (edited and added pictures) (215). The fourth mobile terminal D also can send the relay message attaching the modified picture to the third mobile terminal C as the previous relay message recipient (213). The fourth mobile terminal D checks the information on the next relay message recipient with reference to the recipient identifier included in the relay information field of the relay message header. The next relay message recipient information lists a series of recipient in sequential order. In an exemplary embodiment of the present invention, the fourth mobile terminal D can send the relay message attaching the modified picture information to the third mobile terminal C as the previous relay message recipient and the first mobile terminal A as the relay message sender simultaneously. Before sending the relay message, the four the mobile terminal D removes its identity information from the recipient identifier included in the relay information field and adds its identity information to the message check identifier. The fourth mobile terminal D also can add another picture to the picture information or further edit the picture that has been edited and included in the picture information by the third mobile terminal C.

In an exemplary embodiment of the present invention, the picture information can include the pictures added or sequentially edited by the relay message recipients.

Figure 3:
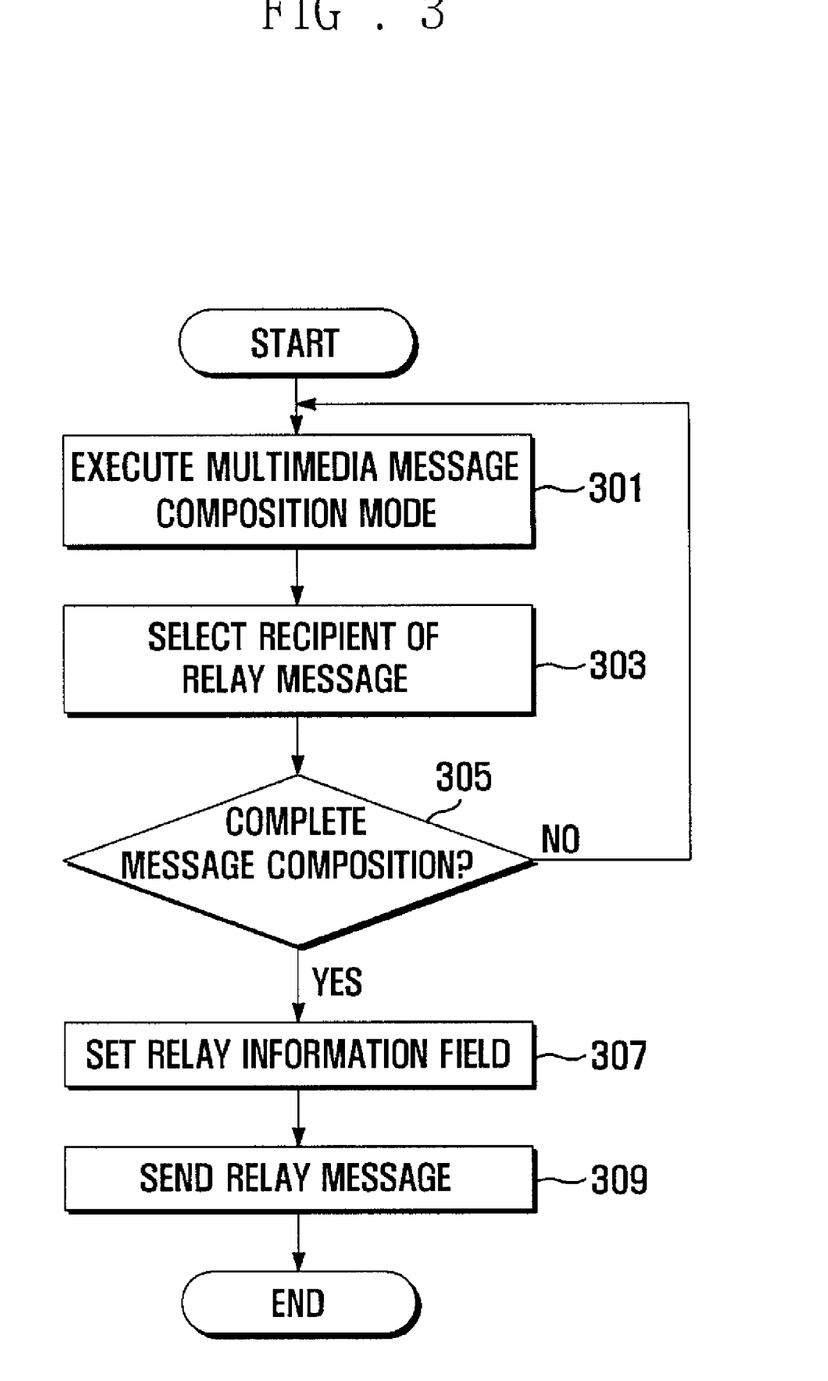
FIG. 3 is a flowchart illustrating a relay message composition procedure of a multimedia messaging method according to an exemplary embodiment of the present invention.

FIG. 3 is a flowchart illustrating a relay message composition procedure of a multimedia messaging method according to an exemplary embodiment of the present invention.

Referring to FIG. 3, the control unit 100 of the mobile terminal detects a multimedia message composition mode execution signal input by the user (301). Once the multimedia message composition mode execution signal is detected, the control unit 100 activates the multimedia message composition mode. In the multimedia message composition mode, the control unit 100 can select at least one picture to be attached to the multimedia message in response to the user instruction. Here, the picture can be selected from the pictures stored in the storage unit 130. The multimedia message may be sent without an attached picture. In this case, a picture can be attached by a recipient.

After executing the multimedia message composition mode, the control unit 100 selects at least one recipient of the multimedia message (i.e. relay message) in response to a user instruction (303). At this time, the at least one recipient can be selected from phonebook list, address book, or other similar sets of recipients or input by the user. When the recipient selection has completed, the control unit 100 determines whether a message composition complete signal is input (305).

If a message composition complete signal is input, the control unit 100 sets the relay field of the relay message (307). The relay information field is included in the header of the multimedia message format and can be defined for requesting the recipient to reply. The relay information field can include various identifiers. Otherwise, when no message composition complete signal is input, the control unit 100 maintains the multimedia message composition mode.

After setting the relay information field of the relay message, the control unit 100 sends the relay message to the at least one recipient in response to the user instruction (309).

Figure 4:
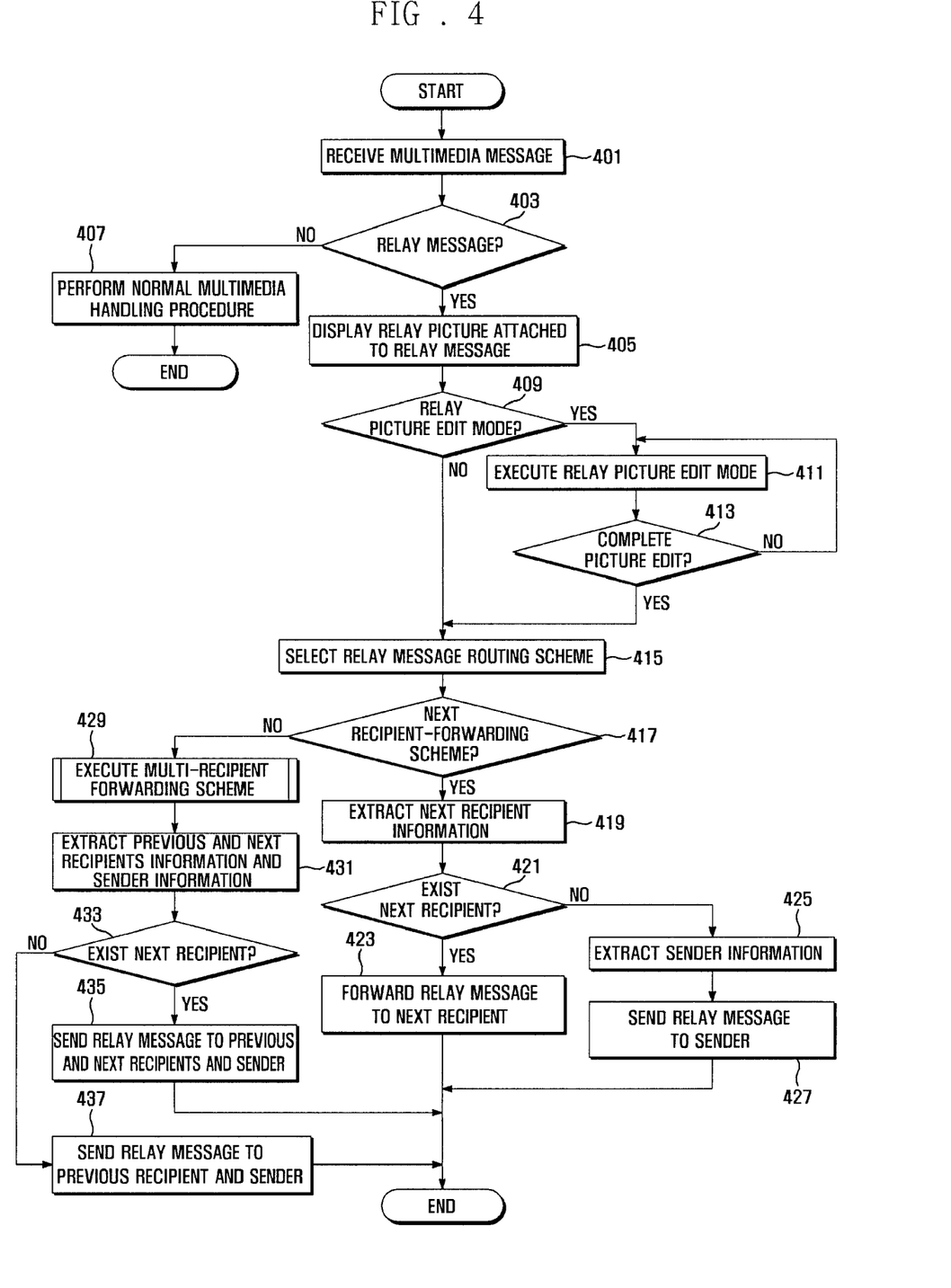
FIG. 4 is a flowchart illustrating a relay message forwarding procedure of a multimedia messaging method according to an exemplary embodiment of the present invention.

FIG. 4 is a flowchart illustrating a relay message forwarding procedure of a multimedia messaging method according to an exemplary embodiment of the present invention.

Referring to FIG. 4, the control unit 100 of the mobile terminal detects a receipt of the multimedia message (401). Upon receipt of the multimedia message, the control unit 100 determines whether the multimedia message is a relay message (403). At this time, the relay message determination is made with reference to the message type identifier included in the relay picture field of the received multimedia message. When it is determined that the received multimedia message is a relay message, the control unit 100 displays the picture attached to the relay message on the display unit 120 (405). Otherwise, if it is determined that the received multimedia message is not a relay message, the control unit 100 performs a normal multimedia message handling procedure (407).

While displaying the picture attached to the relay message, the control unit 100 determines whether a relay picture edit mode execution signal is input (409). If a relay picture edit mode execution signal is input, the control unit 100 executes the relay picture edit mode and edits the relay picture in response to a user instruction (411). The control unit 100 determines whether a picture edit completion signal input by the user (413). If a picture edit completion signal is input, the control unit 100 selects a relay message routing scheme (415). Otherwise, if no picture edit completion signal is input, the control unit 100 continues monitoring to detect the picture edit completion signal while maintaining the relay picture edit mode. The relay picture edit mode according to an exemplary embodiment of the present invention is described in more detail later. If the relay picture edit mode execution signal is not input, the control unit 100 can forward the relay message to the next relay message recipient.

At step 415, the control unit 100 receives a relay message routing scheme selection signal input by the user. There are two relay message routing schemes, i.e. a next recipient-forwarding scheme and a multi-recipient forwarding scheme. In the multi-recipient forward scheme, the relay message is transmitted to the first relay message sender and the recipient that relayed the message right before as well as the next relay message recipient. If a relay message routing scheme selection signal is input, the control unit 100 determines whether the selected routing scheme is the next recipient-forwarding scheme (417). If the selected routing scheme is the next recipient-forwarding scheme, the control unit 100 extracts information on the next relay message recipient of the relay message from the recipient identifier included in the relay information field of the relay message (419). Next, the control unit 100 determines whether a next relay message recipient of the relay message exists based on the next relay message recipient information (421).

If a next relay message recipient of the relay message exists, the control unit 100 forwards the relay message to the next relay message recipient via the multimedia messaging service (423). Otherwise, if no next relay message recipient of the relay message exists, the control unit 100 extracts the information on the first relay message sender. That is, if no next relay message recipient of the relay message exists, the control unit 100 determines the current recipient is the last recipient. At this time, the control unit can obtain the first relay message sender with reference to the first relay message sender identifier included in the relay information field.

After extracting the first relay message sender identifier, the control unit 100 feeds back the relay message to the first relay message sender (427).

Returning to step 417, if the selected routing scheme is not the next recipient-forwarding scheme, the control unit 100 executes the multi-recipient forwarding scheme (429).

Once the multi-recipient forwarding scheme is executed, the control unit 100 extracts the information on the previous relay message recipient, the next relay message recipient, and the first relay message sender (431). Next, the control unit 100 determines whether the next relay message recipient exists based on the extracted information (433). The determination on the existence of the next relay message recipient can be made with reference to the recipient identifier included in the relay information field.

If a next relay message recipient exists, the control unit 100 sends the relay message to the previous relay message recipient, the next relay message recipient, and the first relay message sender simultaneously via the multimedia messaging service (435).

Otherwise, if no next relay message recipient exists, the control unit 100 sends the relay message to the previous relay message recipient and the first relay message sender via the multimedia messaging service (437).

Figure 5:
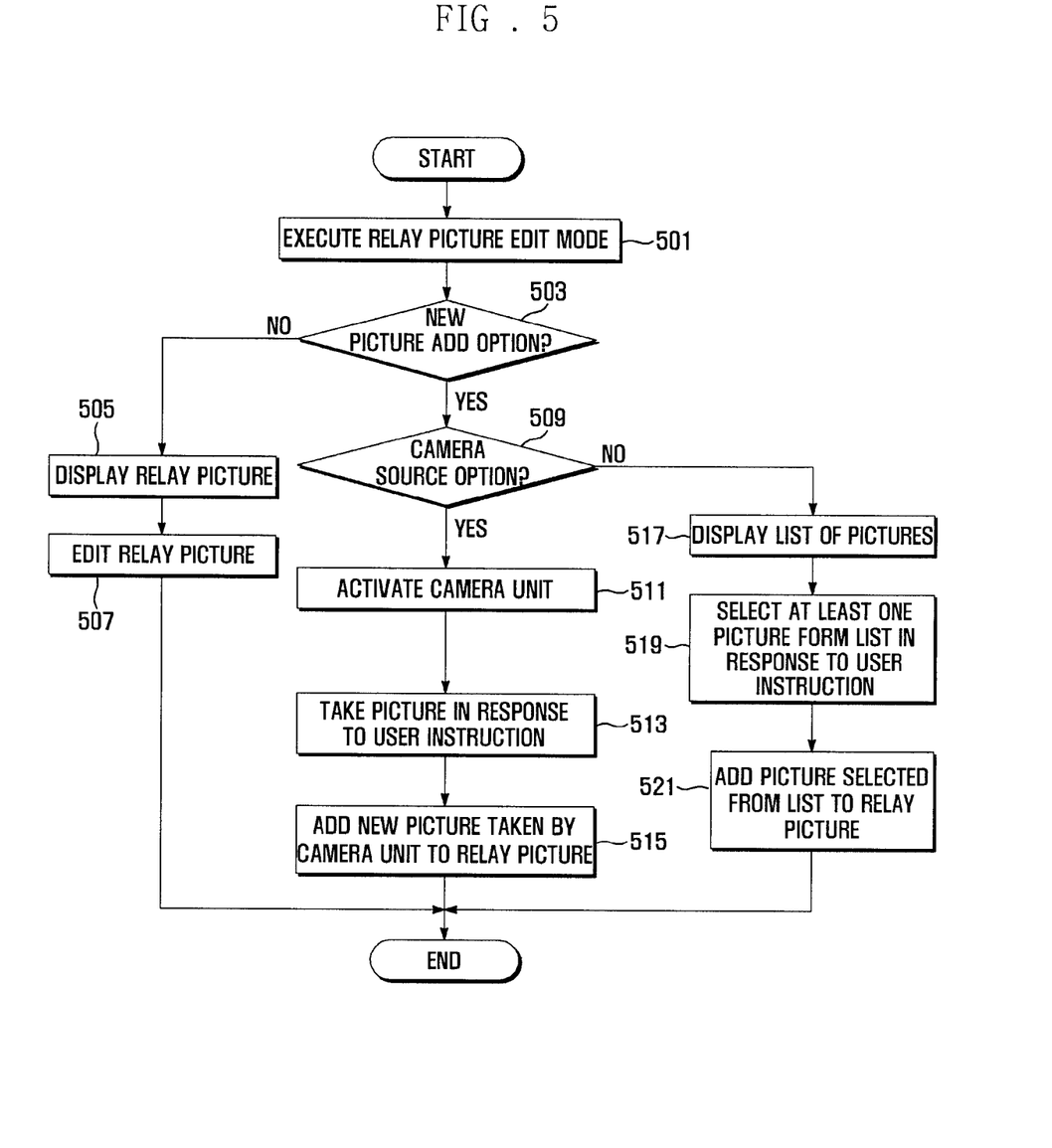
FIG. 5 is a flowchart illustrating a picture edit process in the picture edit mode executed at step 411 of FIG. 4.

FIG. 5 is a flowchart illustrating a picture edit process in the picture edit mode executed at step 411 of FIG. 4. If a picture edit mode signal is detected, the control unit 100 executes the relay picture edit mode for editing the relay picture attached to the received relay message (501). Once the relay picture edit mode is executed, the control unit 100 selects one of the predetermined relay picture processing options in response to a user instruction (503). The relay picture processing options include a new picture add option and a relay picture edit option.

If the relay picture edit option is selected, the control unit 100 displays the relay picture attached to the relay message received via the multimedia messaging service on the display unit 120 (505). Next, the control unit 100 edits the relay picture using a relay picture edit function (507). The relay picture edit function can provide cut and modification tools. Otherwise, if the new picture-add option is selected at step 503, the control unit 100 selects a predetermined picture add option in response to a user instruction (509). The picture-add options include a storage source option and a camera source option. If the camera source option is selected at step 509, the control unit 100 activates the camera unit 140 with the execution of the camera mode (511). Next, the control unit 100 controls the camera unit 140 to a picture in response to a user instruction (513). The picture taken by the camera unit 140 can be stored in the storage unit 130. Next, the control unit 100 combines the new picture taken by the camera with the relay picture (515).

If the storage source option is selected at step 509, the control unit 100 displays a list of pictures stored in the storage unit 130 on the display unit 120 (517). Next, the control unit 100 selects at least one picture from the list in response to a user instruction (519) and combines the picture selected by the user with the relay picture (521).

Figure 6:
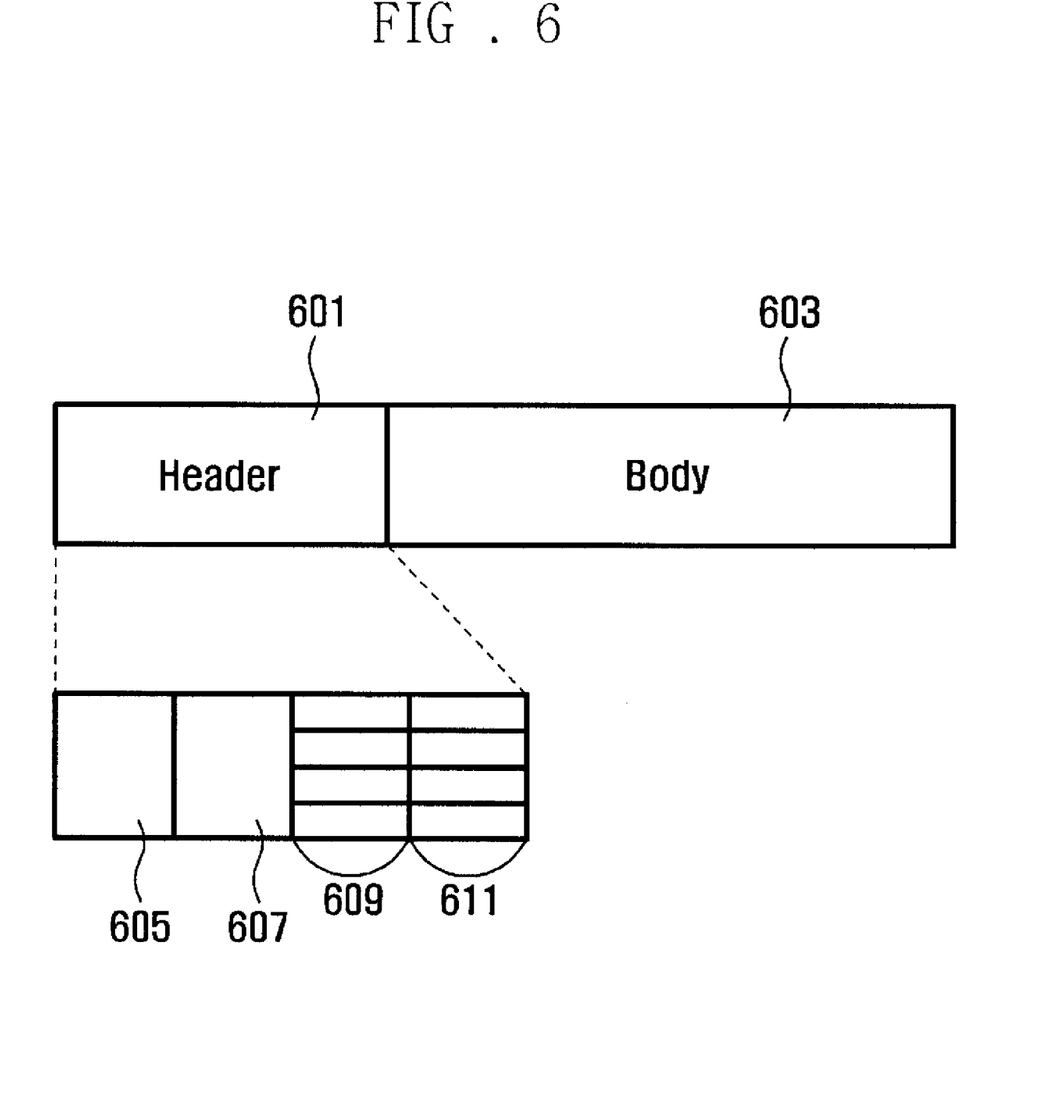
FIG. 6 is a diagram illustrating a relay message format for use in Multimedia messaging method according to an exemplary embodiment of the present invention.

FIG. 6 is a diagram illustrating a relay message format for use in Multimedia messaging method according to an exemplary embodiment of the present invention.

As shown in FIG. 6, a relay message is composed of a header 601 and a body 603. The header of the relay message includes a relay information field composed of a plurality of fields carrying diverse identifiers. Here, the relay information field includes a message type identifier field 605 carrying the message type identifier, a sender identifier field 607 carrying the sender identifier, a recipient identifier field 609 carrying at least one recipient identifier, and a message check identifier field 611 carrying the recipient identifier indicating the recipient that has checked the relay message.

The body of the relay message includes the picture information attached to the relay message. Here, the message type identifier indicates whether the multimedia message is a relay message. For instance, the message type identifier can be set to 1 for indicating a relay message or 0 for indicating a normal multimedia message. The sender identifier indicates the address of the source mobile terminal that has sent the relay message and receives the feedback from the at least one recipient of the relay message. The at least one recipient identifier may be the address of the recipient as the relay and/or destination mobile terminal of the relay message. The recipient identifier of the recipient that has received and forwarded the relay message to the next recipient is removed from the recipient identifier field 609. The recipient identifiers can be listed within the recipient identifier field 609 in order of temporal sequence. The recipient identifiers listed in the message check identifier field 611 indicates the recipients that have received and forwarded the relay message to their next recipients. In the message check identifier field, the recipient identifier of the recipient that has forward the relay message to the next recipient is added. The recipient identifiers of the recipients that have relayed the relay message are listed within the message check identifier field 611 in the order of temporal sequence.

FIG. 7 (represented as FIGS. 7a-7d) is a sequence diagram illustrating update of a header of a relay message as the relay message is relayed by the recipients in the Multimedia messaging method according to an exemplary embodiment of the present invention.

Referring to FIG. 7, a first mobile terminal A, as the relay message sender, sends a mobile terminal B a relay message as shown in an instance [a] of FIG. 7. (FIG. 7a) In this instance, the relay message is composed of a header 700 and a body 709. The header 700 includes the message type identifier field 701, which is set to 1, the sender identifier field 703 set to the mobile terminal A, the recipient identifier field 705 set to the addresses of the recipients (i.e. the mobile terminals B, C, and D), and the message check identifier field 707 remained empty. The body 709 includes picture information on the attached original picture (Fig_origin). The relay message is first sent to the second mobile terminal B with reference to the recipient identifier B listed on top of the recipient identifier field 705. Upon receipt of the relay message from the first mobile terminal A, the second mobile terminal B edits the picture information by adding another picture (Fig_B) and forwards the relay message to the third mobile terminal C with reference to the recipient identifier field. As shown in an instance [b] of FIG. 7 (FIG. 7b), the header 710 of the relay message forwarded by the mobile terminal B includes the message type identifier field 711 set to 1, the sender identifier field 713 set to the mobile terminal A, the recipient identifier field 715 set to the mobile terminals C and D, and the message check identifier field 717 set to the mobile terminal B. The body 719 includes the picture information on the original picture and the picture added by the mobile terminal B (Fig_origin+Fig_B). The picture (Fig_B) can also be obtained by editing the original picture (Fig_Origin). The relay message is forwarded to the third mobile terminal C with reference to the recipient identifier listed on top of the recipient identifier field 715. Simultaneously, the relay message can be sent to the mobile terminal A, i.e. the relay message sender.

Upon receipt of the relay message from the second mobile terminal B, the third mobile terminal C edits the picture information by adding another picture (Fig_C) and forwards the relay message to the fourth mobile terminal D with reference to the recipient identifier field. As shown in an instance [C] of FIG. 7 (FIG. 7c), the header 720 of the relay message forwarded by the mobile terminal C includes the message type identifier field 721 set to 1, the sender identifier field 723 set to the first mobile terminal A, the recipient identifier field 725 set to the mobile terminal D, and the message check identifier field 727 set to the second and third mobile terminals B and C. The body 729 includes the picture information on the pictures added by the first to third mobile terminals A, B, and C (Fig_origin+Fig_B+Fig_C). The picture information (Fig_C) is inserted by the third mobile terminal C. The picture (Fig_C) can be obtained by editing the picture (Fig_B). The relay message is forwarded to the fourth mobile terminal D with reference to the recipient identifier listed on top of the recipient identifier field 725.

Upon receipt of the relay message from the third mobile terminal C, the fourth mobile terminal D edits the picture information by adding another picture (Fig_D) and forwards the relay message to the next relay message recipient with reference to the recipient identifier field. As shown in an instance [d] of FIG. 7d, the header 730 of the relay message forwarded by the mobile terminal D includes the message type identifier field 731 set to 1, the sender identifier field 733 set to the first mobile terminal A, the recipient identifier field 735 remained empty, and the message check identifier field 737 set to the second to fourth mobile terminals B to D. The body 739 of the relay message includes the picture information regarding the pictures added by the first to fourth mobile terminals A to D (Fig_origin+Fig_B+Fig_C+Fig_D). The picture information (Fig_D) is inserted by the fourth mobile terminal D and can be obtained by editing the picture (Fig_C).

Figure 7A:
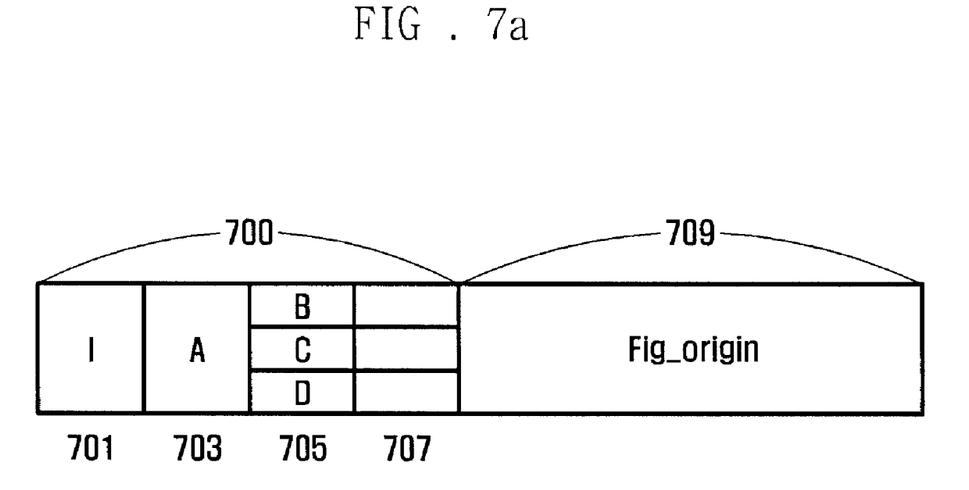
FIG. 7 (represented as FIGS. 7*a*-7*d*) is a sequence diagram illustrating update of a header of a relay message as the relay message is relayed by the recipients in the Multimedia messaging method according to an exemplary embodiment of the present invention.
Figure 7B:
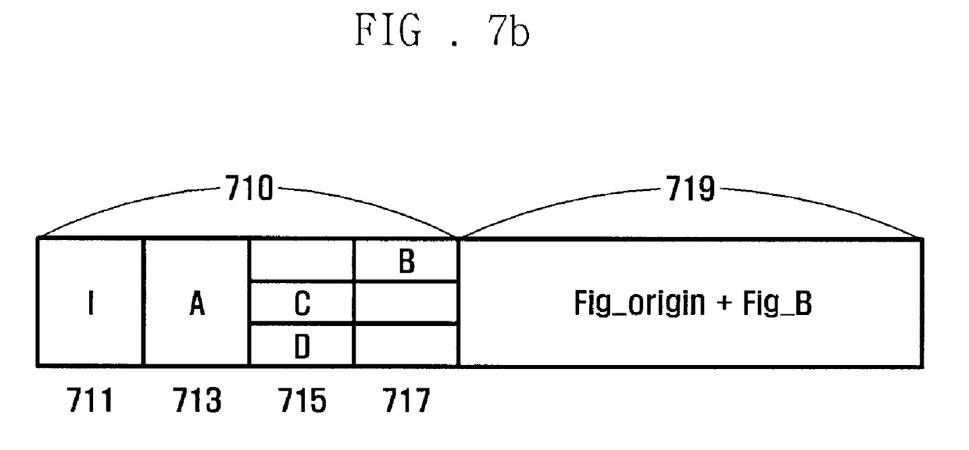
Figure 7C:
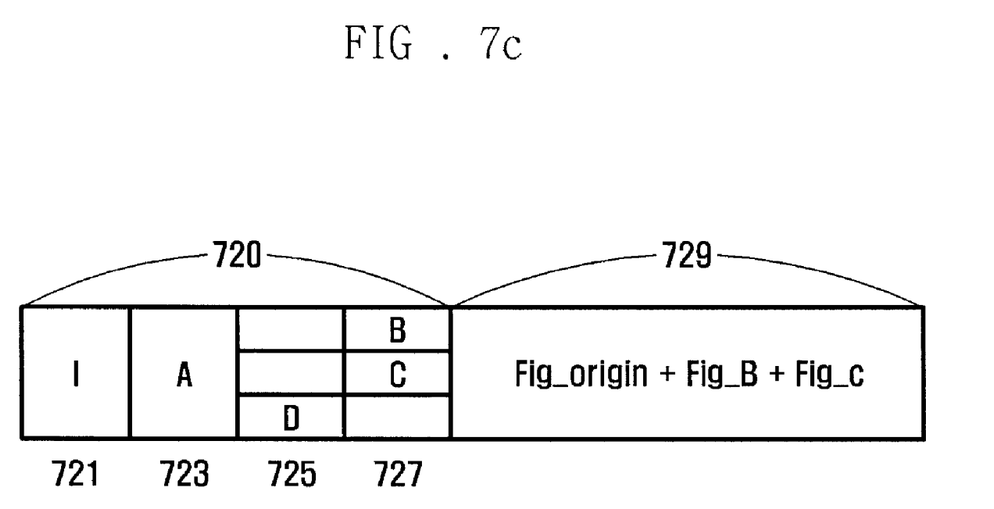
Figure 7D:
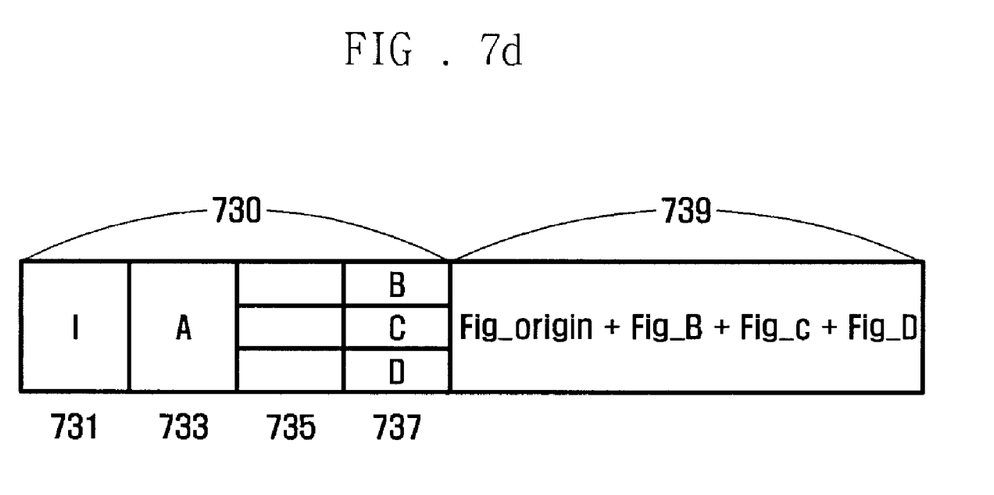

As the final recipient, the mobile terminal D sends the relay message to the relay message sender (the first mobile terminal A). At this time, the relay message can be sent to the first mobile terminal A (the relay message sender) and the third mobile terminal C (the previous recipient) simultaneously.

In an exemplary embodiment of the present invention, the recipient that is not the final recipient of the relay message forwards the relay message to the next recipient, and the final recipient returns the relay message, attaching the edit picture information, to the relay message sender. In an exemplary embodiment of the present invention, the relay message can be sent to the previous and next recipients and the relay message sender simultaneously.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the Multimedia messaging method and apparatus of the present invention allows the multiple users to take part in a discussion on a common interest using the multimedia messaging service.

Also, the Multimedia messaging method and apparatus of the present invention improves the utilization of the multimedia messaging service.

Also, the Multimedia messaging method and apparatus of the present invention enables a user to create a rich multimedia content by reflecting the opinions collected from other users.

What is claimed is:

1. A multimedia message transmission method for a mobile terminal supporting a multimedia messaging service, comprising:
 composing a multimedia message in a multimedia message composition mode;
 inserting a sender information and a recipient information into the multimedia message;

creating a relay message by defining a type of the multimedia message as the relay message, including the step of:
setting a type field of a relay information field of the multimedia message to a predetermined value; and
sending the relay message with reference to the recipient information.

2. The multimedia message transmission method of claim 1, wherein the relay information field comprises a plurality of sub-fields including identifiers.

3. The multimedia message transmission method of claim 2, wherein the identifiers comprise a message type identifier, a sender identifier for indicating a sender of the relay message, at least one recipient identifier indicating a least one recipient of the relay message, and at least one message check identifier indicating at least one recipient that has relayed the relay message.

4. The multimedia message transmission method of claim 1, wherein sending the relay message comprises checking the recipient information and transmitting the relay message to a next recipient based on the recipient information.

5. The multimedia message transmission method of claim 1, wherein sending the relay message comprises checking the recipient information and transmitting the relay message to multiple recipients and the sender simultaneously.

6. A multimedia message reception method for a mobile terminal supporting a multimedia messaging service, comprising:
checking, when a multimedia message is received, a type of the multimedia message;
alerting, when the type of the multimedia message is a relay message, receipt of the relay message to a user;
editing the relay message in response to an instruction of the user;
resetting, when a relay message forward instruction is input, recipient information of the relay message; and
sending the relay message based on the reset recipient information, including the step of: forwarding, when the reset recipient information has information on a next recipient, the relay message to the next recipient.

7. The multimedia message reception method of claim 6, wherein editing the relay message comprises attaching, when the relay message having an attached picture, at least one other picture to the relay message in response to a user instruction.

8. The multimedia message reception method of claim 6, wherein editing the relay message comprises modifying, when the relay message having an attached picture, the attached picture in response to a user instruction.

9. The multimedia message reception method of claim 6, wherein resetting recipient information of the relay message comprises removing a recipient identifier from a recipient identifier field of the relay message, the recipient identifier field including identifiers allocated to the recipients of the relay message.

10. The multimedia message reception method of claim 9, wherein resetting recipient information of the relay message comprises adding the recipient identifier removed from the recipient identifier field to a message check identifier field.

11. The multimedia message reception method of claim 6, wherein sending the relay message comprises feeding back, when the reset recipient information has no information regarding a next recipient, the relay message to a sender indicated by a sender identifier field of the relay message.

12. The multimedia message reception method of claim 6, wherein sending the relay message comprises transmitting, when the reset recipient information has information on a next recipient, the relay message to a previous recipient, a next recipient, and a sender of the relay message simultaneously in response to a user instruction.

13. The multimedia message reception method of claim 6, wherein sending the relay message comprises transmitting, when the reset recipient information has no information on the next recipient, the relay message to a previous recipient and a sender of the relay message simultaneously in response to a user instruction.

14. A multimedia message communication apparatus of a mobile terminal supporting a multimedia messaging service, comprising:
an input unit which receives information on recipients of a relay message;
a display unit which displays a relay picture attached to the relay message; and
a control unit which generates and sends the relay message with a message type of a multimedia message, the recipient information, and sender information, resets, when receiving a relay message, the recipient information and sends the relay message with the reset recipient information, wherein the control unit sets a relay information field of the relay message for sending the relay message via the multimedia messaging service.

15. The multimedia message communication apparatus of claim 14, wherein the relay information field comprises a plurality of fields of a header of a multimedia message format, and the fields are set with individual identifiers.

16. The multimedia message communication apparatus of claim 15, wherein the identifiers comprises a message type identifier, a sender identifier for indicating a sender of the relay message, at least one recipient identifier indicating at least one recipient of the relay message, and at least one message check identifier indicating at least one recipient that has relayed the relay message.

17. The multimedia message communication apparatus of claim 14, wherein the control unit generates the relay message and transmits the relay message to a next recipient based on the recipient information.

18. The multimedia message communication apparatus of claim 14, wherein the control unit generates the relay message and transmits the relay message to multiple recipients and the sender simultaneously.

19. The multimedia message communication apparatus of claim 14, wherein the control unit edits the relay message by attaching, when the relay message having an attached picture, at least one other pictures to the relay message in response to a user instruction.

20. The multimedia message communication apparatus of claim 14, wherein the control unit edits the relay message by modifying, when the relay message having an attached picture, the attached picture in response to a user instruction.

21. The multimedia message communication apparatus of claim 14, wherein the control unit resets the recipient information of the relay message by removing a recipient identifier from a recipient identifier field of the relay message, the recipient identifier field including identifiers of allocated to the recipients of the relay message.

22. The multimedia message communication apparatus of claim 21, wherein the control unit adds the recipient identifier removed from the recipient identifier field to a message check identifier field.

23. The multimedia message communication apparatus of claim 14, wherein the control unit forwards, when the reset recipient information has information on a next recipient, the relay message to the next recipient.

24. The multimedia message communication apparatus of claim 14, wherein the control unit feeds back, when the reset recipient information has no information on the next recipient, the relay message to a sender indicated by a sender identifier field of the relay message.

25. The multimedia message communication apparatus of claim 14, wherein the control unit transmits, when the reset recipient information has information on a next recipient, the relay message to a previous recipient, a next recipient, and a sender of the relay message simultaneously in response to a user instruction.

26. The multimedia message communication apparatus of claim 14, wherein the control unit transmits, when the reset recipient information has no information on the next recipient, the relay message to a previous recipient and a sender of the relay message simultaneously in response to a user instruction.

* * * * *